United States Patent
Pegorier et al.

(10) Patent No.: US 10,899,226 B2
(45) Date of Patent: Jan. 26, 2021

(54) VEHICLE TRIM ELEMENT COMPRISING A DEFORMABLE PART FOR DELIMITING A FUNCTIONAL SPACE

(71) Applicant: Faurecia Interieur Industrie, Nanterre (FR)

(72) Inventors: Nicolas Pegorier, Parmain (FR); Eric Vanel, Novilliers (FR); Fernandez Rayar, Beauvais (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 87 days.

(21) Appl. No.: 16/128,260

(22) Filed: Sep. 11, 2018

(65) Prior Publication Data

US 2019/0077263 A1 Mar. 14, 2019

(30) Foreign Application Priority Data

Sep. 11, 2017 (FR) ..................................... 17 58378

(51) Int. Cl.
*B60K 37/02* (2006.01)
*B60R 13/02* (2006.01)
(Continued)

(52) U.S. Cl.
CPC .............. *B60K 37/02* (2013.01); *B60K 37/04* (2013.01); *B60N 3/00* (2013.01); *B60R 13/0256* (2013.01);
(Continued)

(58) Field of Classification Search
CPC .. B60K 37/02; B60K 37/04; B60K 2370/654; B60K 2370/67; B60R 13/0275; B60R 13/0256; B60R 2013/0287; B62D 1/183
(Continued)

(56) References Cited

U.S. PATENT DOCUMENTS

| 7,931,322 B2 | 4/2011 | O'Brien et al. |
| 2005/0030256 A1* | 2/2005 | Tubidis ................... B60K 35/00 345/30 |

(Continued)

FOREIGN PATENT DOCUMENTS

| DE | 19609408 B4 | 1/2006 |
| DE | 102016011461 A1 | 4/2017 |

(Continued)

OTHER PUBLICATIONS

French Search Report corresponding to French application No. FR 1758378, dated Apr. 17, 2018, 2 pages.

*Primary Examiner* — Jason S Morrow
*Assistant Examiner* — E Turner Hicks
(74) *Attorney, Agent, or Firm* — Reising Ethington P.C.

(57) ABSTRACT

The vehicle trim element includes a body defining the outer surface of the trim element, said outer surface including at least one main area and at least one secondary area, the body including at least one deformable part forming a flap movable in the secondary area between a first stable position, in which said flap extends substantially in the continuation of the main area, and at least one second stable position, in which the flap forms a non-zero angle with the main area so as to extend protruding from said main area. In the second position, the flap forms a wall on one side of which a functional space extends opposite the secondary area.

10 Claims, 1 Drawing Sheet

(51) Int. Cl.
  *B60K 37/04*  (2006.01)
  *B60N 3/00*  (2006.01)
  *B62D 1/183*  (2006.01)

(52) U.S. Cl.
  CPC .... *B60R 13/0275* (2013.01); *B60K 2370/654* (2019.05); *B60K 2370/67* (2019.05); *B60R 2013/0287* (2013.01); *B62D 1/183* (2013.01)

(58) Field of Classification Search
  USPC ............... 296/70, 1.08, 37.12, 187.05, 37.8
  See application file for complete search history.

(56) References Cited

U.S. PATENT DOCUMENTS

| | | | |
|---|---|---|---|
| 2006/0082109 A1* | 4/2006 | Hier | B29C 44/0461 280/732 |
| 2007/0296194 A1* | 12/2007 | Ridgway | B62D 1/187 280/775 |
| 2008/0035657 A1 | 2/2008 | Yamashita | |
| 2013/0106129 A1* | 5/2013 | Brant | B62D 1/187 296/1.08 |
| 2014/0277896 A1 | 9/2014 | Lathrop et al. | |
| 2016/0121918 A1* | 5/2016 | Soderlind | B62D 1/181 74/493 |

FOREIGN PATENT DOCUMENTS

| | | |
|---|---|---|
| EP | 1544040 A1 | 6/2005 |
| EP | 1989079 A1 | 11/2008 |
| FR | 2861657 A1 | 5/2005 |

\* cited by examiner

VEHICLE TRIM ELEMENT COMPRISING A DEFORMABLE PART FOR DELIMITING A FUNCTIONAL SPACE

FIELD OF THE INVENTION

The present invention relates to a vehicle trim element, of the type including a body defining the outer surface of the trim element, said outer surface including at least one main area and at least one secondary area, the body including at least one deformable part forming a flap movable in the secondary area between a first stable position, in which said flap extends substantially in the continuation of the main area, and at least one second stable position, in which the flap forms a non-zero angle with the main area so as to extend protruding from said main area.

BACKGROUND

The present invention also relates to a vehicle functional assembly including such a trim element.

In the context of autonomous vehicles, in which driver intervention is reduced, or even almost nonexistent, to drive the vehicle, the arrangement of the passenger compartment may be configurable by modifying the orientation and/or the position of the seats, since they no longer necessarily need to face the road. It is thus for example possible to provide for turning the seats toward one another and/or placing the seats in elongated, more comfortable positions for the vehicle's passengers.

Such vehicles are generally configurable in a manual driving configuration, in which a driver can drive the vehicle and an automatic or autonomous driving configuration, in which the driver does not intervene. In this autonomous driving configuration, certain functional elements of the vehicle, such as the steering wheel and the steering column, are therefore not used, and it may be provided to make these functional elements configurable so as to be able to position them in a retracted position, in which these functional elements are moved from the passenger compartment of the vehicle to increase the volume thereof and thus improve passenger comfort.

However, there would also be needed to adapt the shape of the trim elements of the passenger compartment based on the configuration of the vehicle, in particular in order to improve the functionality thereof in the manual driving configuration and to improve the comfort and appearance thereof in the autonomous driving configuration.

SUMMARY

One of the aims of the invention is to propose a solution to this problem by providing a trim element having a configurable shape in order to adapt it to a configuration of the vehicle.

To that end, the invention relates to a trim element of the aforementioned type, wherein, in the second position, the flap forms a wall from a side of which a functional space extends opposite the secondary area.

By positioning the flap in the first position, the outer surface of the trim element has a substantially continuous shape with a pleasing appearance and freeing the view, for example opposite the driver, which improves the latter's comfort when the vehicle is in an autonomous driving configuration. By positioning the flap in the second position, the functional space thus delimited may for example serve to delimit an area displaying information necessary to drive the vehicle, which improves the functionality thereof when the latter is in the manual driving configuration.

Various other embodiments of the invention may include any one or more of the following features, considered alone or according to any technically possible combination:
- the body includes at least two deformable parts forming two flaps movable in the secondary area, between the first stable position, in which the two flaps extend substantially in the continuation of the main area, and the second stable position, in which each flap forms a non-zero angle with the main area so as to extend protruding from the main area, said flaps each forming a wall, the functional space extending between said walls in said second position;
- the trim element further includes at least one display device extending protruding from the outer surface, at least part of said display device extending in the functional space delimited by the flap in the second position;
- the display device is movable relative to the body between a first position, in which at least part of the display device extends in the functional space, and a second position, in which the display device extends completely opposite the main area;
- the trim element further includes at least one frame movable between a retracted position, when the flap is in the first position, and a deployed position, when the flap is in the second position and in which said frame extends in the functional space so as to surround a display space in said functional space;
- a part of the frame extends substantially in the continuation of the main area and the flap in the retracted position;
- the flap rotates around an axis of rotation substantially perpendicular to a main direction of the outer surface between the first and second positions;
- a cover layer extends over at least part of the body in the main area and the secondary area, the cover layer forming the outer surface of the trim element, said cover layer being resilient at least in the secondary area, such that the flap does not form a fold with the main area during the movement between the first position and the second position; and
- the trim element forms a vehicle dashboard.

According to another aspect, the invention also relates to a vehicle functional assembly including a trim element as described above and at least one functional element extending opposite the secondary area of the element of the trim element, said functional element being movable between a deployed position, in which it extends protruding from the trim element, when the flap is in the second position, and a retracted position, in which it is folded down against the trim element, when the flap is in the first position.

The shape of the trim element can thus be adapted to the configuration in which the vehicle is set, in particular in a manner coordinated with the position of the functional element, such as a steering wheel of the vehicle.

BRIEF DESCRIPTION OF THE DRAWINGS

Other aspects and advantages of the invention will appear upon reading the following description, provided solely as an example and done in reference to the appended drawings, in which.

DETAILED DESCRIPTION

Figure 1:
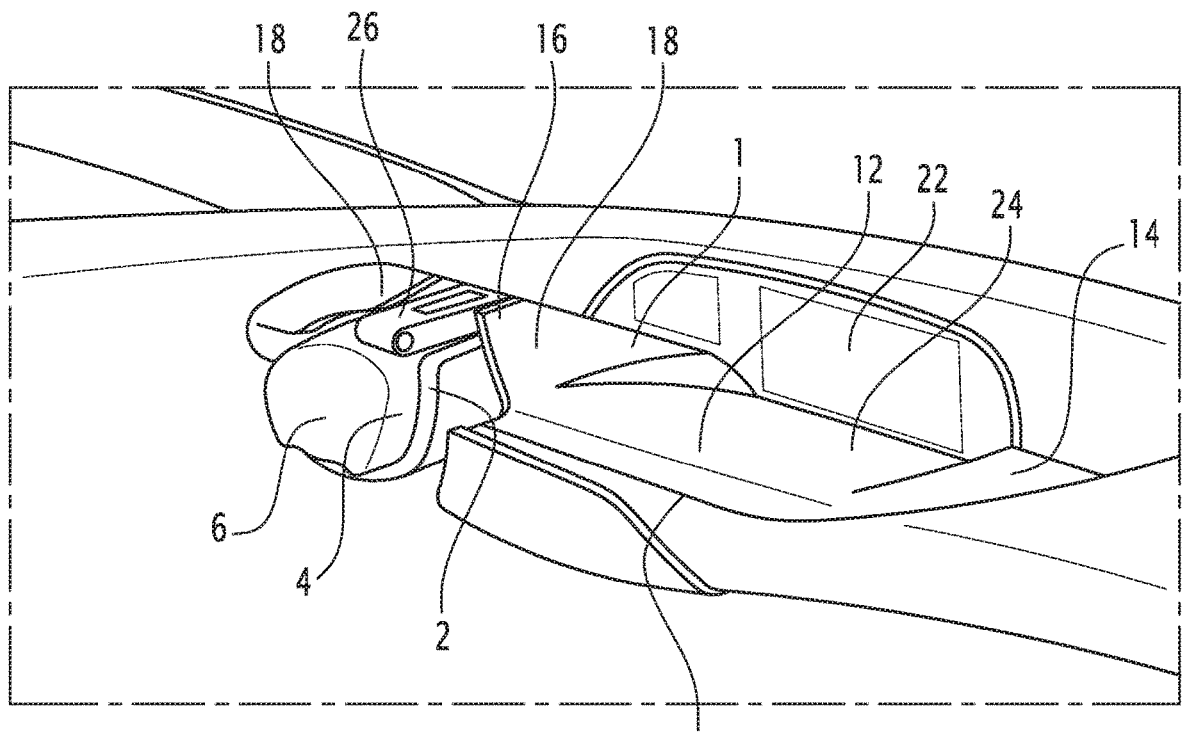
FIG. 1 is a schematic illustration of a functional assembly according to the invention, comprising a trim element whereof the deformable part is in a first position.

In reference to the figures, a vehicle functional assembly is described including a trim element 1 and a functional element 2. The functional assembly shown in the figures is a driving assembly, in which the trim element 1 forms a dashboard of the vehicle and in which the functional element 2 is a steering column 4, provided with a steering wheel 6. It is, however, understood that the invention may apply to other parts of the vehicle. For example, the trim element could be a door panel or seat trim and the functional element could be a bearing element, such as an armrest, or a tray.

The trim element 1 includes a body 8 defining the outer surface 10 of the trim element 1, i.e., the visible surface of the trim element 1, for example from the passenger compartment of the vehicle in which the trim element 1 is installed. "Defining the outer surface" means that the outer surface 10 follows the shape of a surface of the body 8. In other words, the outer surface 10 can be formed by the body 8 or by a decorative layer 12 extending over at least part of the body 8 and adopting the shape of a surface of the body 8.

The outer surface 10 includes a main area 14 and a secondary area 16, deformable relative to the main area 14. In the case of the dashboard shown in the figures, the main area 14 forms the majority of the outer surface 10 and the secondary area 16 forms part of the outer surface 10 extending opposite the driver of the vehicle, such that, according to this embodiment, the functional element 2, formed by the steering column 4, faces the secondary area 16.

Figure 2:
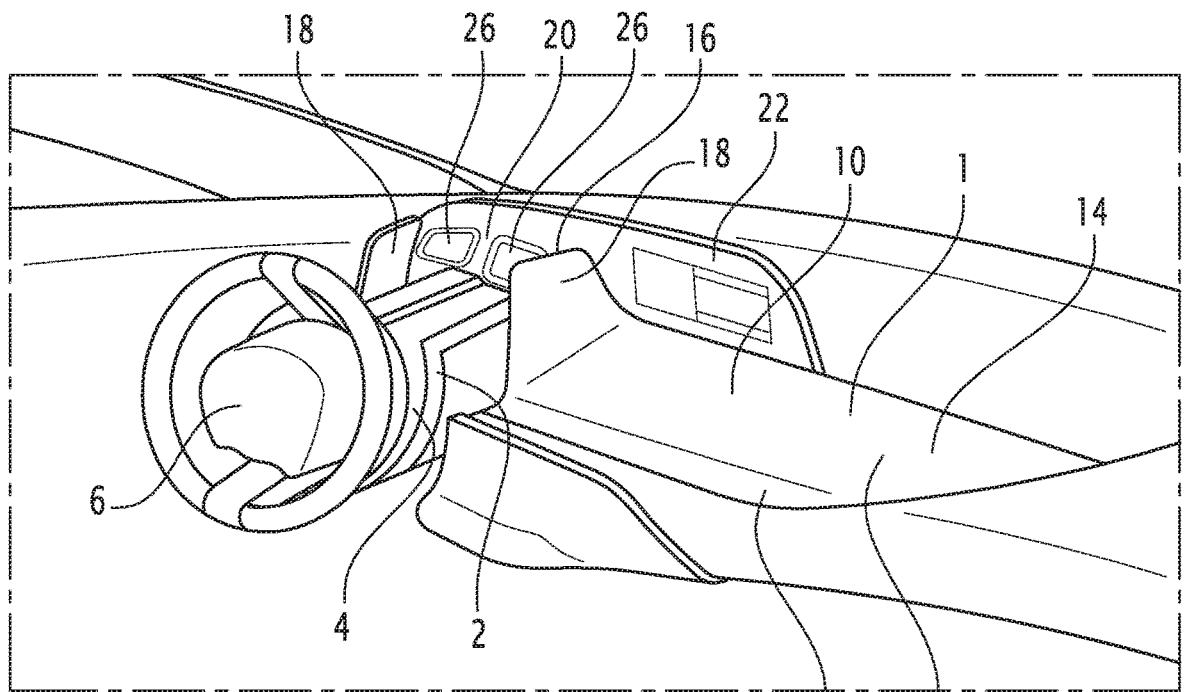
FIG. 2 is a schematic illustration of the functional assembly of FIG. 1, the deformable part being in a second position.

In the secondary area 16, the body 8 includes at least one deformable part forming a flap 18 movable into a first stable position (FIG. 1) and a second stable position (FIG. 2). "Stable position" means that the flap stays in the position in which it has been placed without outside stress on the flap. The body 8 is thus made in one single integral part defining the main area 14 and the secondary area 16. In other words, the flap 18 is integral with the rest of the body 8.

In the first position, the flap 18 extends substantially in the continuation of the main area 14. This means that the flap 18 follows the shape defined by the main area 14. Thus, if the main area 14 is substantially mainly flat, the flap 18 extends such that the part of the outer surface 10 defined by the flap 18 extends substantially in the same plane as the main area 14. If the main area 14 is domed, the part of the outer surface 10 defined by the flap 18 is curved so as to follow the curvature of the main area 14. Thus, in the first position, the outer surface 10 is substantially continuous and offers a clear space opposite the outer surface 10. Thus, in the case of the dashboard, the clear space extends above the outer surface 10 and offers significant visibility toward the windshield, both in the main area 14 and in the secondary area 16.

In the first position, the flap 18 for example covers at least part of an opening receiving the functional element 2 so as to hide part of this functional element 2, as will be described later.

In the first position, the trim element has a reduced bulk and leaves a significant free space in particular above the trim element 1 in the case of a dashboard, which makes it possible to improve the visibility and comfort of the passengers of the vehicle, and in particular its driver. Furthermore, the esthetics of the outer surface 10 are satisfactory, since the outer surface 10 offers a continuous and harmonious appearance. The first position is for example adopted when the vehicle is in an autonomous driving configuration, in which the driver does not participate in driving the vehicle.

In the second position, the flap 18 is deformed so as to form a non-zero angle with the main area 14 and to extend protruding therefrom, as shown in FIG. 2. The angle formed by the flap 18 and the primary surface is for example comprised between 45° and 120°, for example close to 90°. In the second position, the flap 18 delimits a functional space 20 extending opposite the secondary area 16. Thus, in the second position, the flap 18 forms a wall, on one side of which the functional space 20 extends opposite the secondary area 16 and on the other side of which a free space extends opposite the main area 14. "Functional space" refers to a space intended to receive a functional element or a part thereof, or a space making it possible to reveal a functional element, as will be described later.

In the second position, the flap 18 is for example cleared from the opening that it covers in the first position, as shown in FIG. 2.

The movement of the flap 18 between the first and second positions is for example a rotating movement. The axis of rotation for example extends in a direction substantially perpendicular to a main direction in which the trim element extends. In the case of a dashboard, the main direction for example corresponds to the width of the vehicle and the axis of rotation extends in the front-back direction of the vehicle.

When the body 8 is covered by a cover layer 12, the latter is for example resilient, in the secondary area 16, such that the deformation of the deformable part between the first and second positions is done without forming folds in the outer surface 10 of the trim element 1 such that the appearance of the trim element remains pleasing both in the first and second positions.

The movement of the flap 18 between the first and second positions is for example done using an actuator arranged to move the flap 18. Such an actuator is for example formed by a pneumatic element that inflates to move the flap 18 toward the second position, and that remains inflated to keep the flap 18 in the second position and deflates to return the flap 18 to the first position. The actuator is for example hidden by the deformable part of the body 8 in all of the positions, so that it is not visible from the passenger compartment of the vehicle. Alternatively, the actuator can be of another type, for example a jack or other means.

According to the embodiment shown in the figures, the body 8 comprises two deformable parts, each forming a flap 18, in the secondary area 16. The two flaps 18 extend on either side of the opening formed in the secondary area 16 so as to cover at least part of this opening in the first position and so as to free the opening in the second position while extending on either side thereof.

In the first position, the two flaps 18 extend substantially in the continuation of the main area 14, and in the second position, the two flaps 18 delimit the functional space 20 between them, i.e., each flap 18 forms a wall, the functional space 20 extending between these two walls. The two flaps 18 turn in opposite directions to enter the second position so as to "open" on either side of the opening during the passage toward the second position, which offers visually pleasing kinematics during this movement. Thus, in the second position, the two flaps 18 extend substantially in the same direction protruding from the main area. The two flaps 18 for example extend substantially parallel to one another or are slightly inclined towards one another or move away from one another in the second position, depending on the desired appearance of the trim element in this second position.

Furthermore, the lower surfaces of the flaps 18, i.e., the surfaces that cover the opening in the first position, face each other in the second position.

According to the embodiment illustrated in the figures, the trim element 1 further includes at least one display device 22 extending protruding from the outer surface 10, i.e., in the space extending above the outer surface 10, in the case of a dashboard. The display device 22 is for example formed by a screen capable of displaying information relative to the vehicle, such as information on the driving of the vehicle (speed, fuel and oil levels, etc.), geolocation information, and/or audiovisual content.

The display device 22 is for example arranged so that a portion thereof extends opposite the secondary area 16 of the trim element. Thus, in the second position of the trim element, the flap(s) 18 delimit an area of the display device 22 that extends in the functional space 20. By displaying the information relative to the driving of the vehicle in this area, it is thus possible to concentrate the attention of the driver of the vehicle on this information when the trim element is in the second position. Such an arrangement is particularly advantageous when the trim element adopts the second position in a manual driving configuration of the vehicle, in which a driver drives the vehicle. The functional space 20 thus performs the "combo" role of the vehicle, in which all of the information relative to the instrumentation of the vehicle and necessary for driving is displayed. The part of the display device that extends outside the functional space 20 may for example be used to display geolocation information of the vehicle and/or information intended for other occupants of the vehicle and/or information relative to functional elements of the vehicle not related to driving, such as information on the air conditioning system, the sound system or the like of the vehicle.

When the trim element is in the first position, the display of the display device 22 is no longer divided into an area extending in the functional space 20 and an area extending outside this space and may be used to display information and/or audiovisual content intended for all of the occupants of the vehicle, including intended for the driver, who is not occupied with driving the vehicle when the first position corresponds to the autonomous driving configuration of the vehicle.

According to the embodiment shown in the figures, the display device 22 may further be movable relative to the outer surface 10 so as to move in a coordinated manner with the deformation of the trim element. Thus, the display device 22 may be arranged to be positioned in a first position substantially at the center of the trim element 1, completely opposite the main area 14, along the main direction when the trim element is in the first position in order to improve the visibility thereof for all of the occupants of the vehicle, as shown in FIG. 1. When the trim element 1 enters the second position, the display device can be translated along the main direction into a second position, in which part of the display area of the display device 22 is placed in the functional space 20 so as to form the combo intended for the driver, as shown in FIG. 2.

It will be noted that the main area 14 of the trim element 1 may also include a deformable zone, for example arranged to form a basin 24 forming a hollow substantially at the center of the trim element when the display device 22 is in the first position so as to improve the visibility of the display area of the display device 22, as shown in FIG. 1.

According to an embodiment shown in the figures, the trim element 1 further includes at least one frame 26 extending in the secondary area 16 and movable between a retracted position, when the trim element 1 is in the first position, and a deployed position, when the trim element 1 is in the second position.

In the retracted position, the frame 26 for example extends between the two flaps 18 and forms part of the outer surface 10 of the trim element 1 so as to provide continuity of the outer surface 10 in the secondary area 16, as shown in FIG. 1.

In the deployed position, the frame 26 extends in the functional space 20 and delimits a display space inside the frame 26. According to the embodiment shown in FIG. 2, the frame 26 makes it possible, in cooperation with the display device 22, to delimit a particular space of the display area of the display device 22 extending in the functional space 20. Thus, the frame 26 for example makes it possible to isolate a particular space of this display area in order to form a speed counter or the like. According to one embodiment, the frame 26 may include a lens in order to enlarge the information displayed in the particular space of the display device 22 framed by the frame 26. According to another embodiment, another display device may be provided directly in the frame 26 in order for this display device to be visible only when the frame 26 is in the deployed position. According to this embodiment, the display device 22 may then not move in the functional space 20 and at least part of the combo may be displayed in the display device provided in the frame 26.

According to the embodiment shown in the figures, the trim element 1 includes two frames 26, as described above. In the deployed position, the frames 26 are adjacent to one another so as to define two separate display areas, which makes it possible to reproduce the appearance of a traditional vehicle combo, as shown in FIG. 2. In the retracted position, the frames 26 for example extend in the opening while leaving their edge visible so as to form a part of the outer surface 10 of the trim element, as shown in FIG. 1. Each frame 26 is for example mounted on one of the flaps 18 and is arranged to move in a coordinated manner with the flap 18 so as to move between the retracted and deployed positions when the flap 18 moves between the first and second positions. Alternatively, the frames may be mounted on the display device 22.

The deformation of the trim element 1 is advantageously coordinated with the movement of the functional element 2 between a retracted position, when the trim element 1 is in the first position, and a deployed position, when the trim element 1 is in the second position.

In the case of a steering column 4, the latter may for example move in the front-back direction of the vehicle in order to bring the steering wheel 6 closer to the driver in the deployed position. Furthermore, the steering wheel 6 may also include at least one gripping element 28 that is also movable between a retracted position and a deployed position. In the retracted position, the gripping element 28 is for example folded down against the steering column 4, and in the deployed position, the gripping element 28 is for example moved away from the steering column 4 in the radial direction so as to guarantee good grasping thereof by the driver.

Thus, when the trim element 1 is in the first position, the functional element 2 is for example retracted against or inside the trim element 1 in order to free a space in the passenger compartment of the vehicle. When the trim element 1 is in the second position, part of the functional element 2 is separated from the trim element 1 in order to be more accessible for an occupant of the vehicle.

In the case of the steering column 4 and a first position corresponding to an autonomous driving configuration of the vehicle, the steering column 4 and the gripping element 28 of the steering wheel 6 are placed in the retracted position in order to increase the available space in the passenger compartment of the vehicle. In the second position, corresponding to a manual driving configuration of the vehicle, the steering column 4 and the gripping element 28 of the steering wheel 6 are in the deployed position in order to be accessible to the driver and the flap(s) 18 define the functional space 20 so as to form the combo for the driver's attention. It will be noted that the driver's seat may also move in a coordinated manner with the functional assembly so as to place the driver in an appropriate position for manual driving of the vehicle or in another position when the driver does not need to participate in driving the vehicle.

The trim element 1 is therefore configurable to adapt to the configuration in which the vehicle is placed, for example in a coordinated manner with one or several functional elements of the vehicle.

It should be noted that in the embodiment described above, the first position has been described as corresponding to the autonomous driving configuration of the vehicle and the second position as corresponding to the manual driving configuration. It is, however, understood that this could be the reverse, the first position corresponding to the manual driving configuration and the second position corresponding to the automatic driving configuration. Thus, as an example, in the case of a functional element formed by a tray, it may be advantageous for this tray only to be accessible in the automatic driving configuration and to be retracted in the trim element 1 in a manual driving configuration of the vehicle. The trim element 1 is then placed in the first position in this configuration so that the flap(s) 18 hide the tray in this manual driving configuration. In the automatic driving configuration, the trim element 1 is moved into the second position so that the flap(s) 18 free a passage for the deployment of the tray, which is then accessible to the occupants of the vehicle.

It is understood that a same trim element 1 may include several secondary areas 16 for example operating in a coordinated manner with several functional elements 2.

The invention claimed is:

1. A vehicle trim element including a body defining an outer surface of the trim element, said outer surface including at least one main area and at least one secondary area, the body including at least two deformable parts forming two flaps integral with the body and movable in the secondary area between a first stable position, in which said flaps extend substantially in the continuation of the main area, and at least one second stable position, in which each flap forms a non-zero angle with the main area so as to extend protruding from said main area, wherein, in the second position, each flap forms a wall with a functional space extending between said walls, wherein each of the flaps defines a respective lower surface, and wherein the lower surfaces of the flaps cover an opening in the first stable position and the lower surfaces of the flaps face each other in the second stable position.

2. The trim element according to claim 1, further including at least one display device extending protruding from the outer surface, at least part of said display device extending in the functional space between the walls formed in the second position.

3. The trim element according to claim 2, wherein the display device is movable relative to the body between a first position, in which at least part of the display device extends in the functional space, and a second position, in which the display device extends completely opposite the main area.

4. The trim element according to claim 1, further including at least one frame movable between a retracted position, when the flap is in the first position, and a deployed position, when the flap is in the second position and in which said frame extends in the functional space so as to surround a display space in said functional space.

5. The trim element according to claim 4, wherein a part of the frame extends substantially in the continuation of the main area and the flap in the retracted position.

6. The trim element according to claim 1, wherein each flap rotates around an axis of rotation substantially perpendicular to a main direction of the outer surface between the first and second positions.

7. The trim element according to claim 1, wherein a cover layer extends over at least part of the body in the main area and the secondary area, the cover layer forming the outer surface of the trim element, said cover layer being resilient at least in the secondary area, such that the flap does not form a fold with the main area during the movement between the first position and the second position.

8. The trim element according to claim 1, forming a vehicle dashboard.

9. A vehicle functional assembly, including a trim element according to claim 1 and at least one functional element extending opposite the secondary area of the outer surface of the trim element, said functional element being movable between a deployed position, in which the functional element extends protruding from the trim element when the flap is in the second position, and a retracted position, in which the functional element is folded down against the trim element when the flap is in the first position.

10. The trim element according to claim 1, where each of the two flaps extend in a same direction protruding from the main area in the second stable position.

* * * * *